US008510948B2

(12) United States Patent
Buswell et al.

(10) Patent No.: US 8,510,948 B2
(45) Date of Patent: Aug. 20, 2013

(54) METHODS AND SYSTEMS FOR FORMING SLOTS IN A SEMICONDUCTOR SUBSTRATE

(75) Inventors: Shen Buswell, Monmouth, OR (US); Rio T. Rivas, Corvallis, OR (US); Mahrgan Khavarl, Corvallis, OR (US); Paul Templin, Encinitas, CA (US); Mark H. MacKenzle, Corvallis, OR (US); Conrad Jenssen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 648 days.

(21) Appl. No.: 11/736,523

(22) Filed: Apr. 17, 2007

(65) Prior Publication Data

US 2007/0240309 A1 Oct. 18, 2007

Related U.S. Application Data

(62) Division of application No. 10/061,492, filed on Jan. 31, 2002, now abandoned.

(51) Int. Cl.
*B21D 53/76* (2006.01)
*B23P 17/00* (2006.01)
*H05B 3/00* (2006.01)

(52) U.S. Cl.
USPC .......... 29/890.1; 29/611

(58) Field of Classification Search
USPC .......... 29/890.1, 611, 729; 347/54, 62, 347/65, 92; 451/36, 37, 38, 57, 58
See application file for complete search history.

(56) References Cited

U.S. PATENT DOCUMENTS 4,721,977 A * 1/1988 Fukae .......... 346/107.1
4,746,935 A * 5/1988 Allen .......... 347/98
4,887,100 A * 12/1989 Michaelis et al. .......... 347/69
4,939,468 A * 7/1990 Takeuchi .......... 324/690
5,081,063 A * 1/1992 Vonno et al. .......... 438/59
5,160,403 A * 11/1992 Fisher et al. .......... 438/21
5,250,084 A * 10/1993 Lansell et al. .......... 51/293
5,266,528 A * 11/1993 Yamada .......... 83/49
5,369,060 A * 11/1994 Baumann et al. .......... 438/460
5,387,314 A * 2/1995 Baughman et al. .......... 216/27
5,391,236 A * 2/1995 Krut et al. .......... 136/249
5,408,739 A * 4/1995 Altavela et al. .......... 29/611
5,441,593 A * 8/1995 Baughman et al. .......... 216/27
5,455,998 A * 10/1995 Miyazono et al. .......... 29/611

(Continued)

OTHER PUBLICATIONS

Wolf, Stanley, PhD, Silicon Processing for the VLSI Era, Lattice Press (1986). (The examiner notes that this reference was provided by the applicant as NPL in U.S. Appl. No. 10/061,492 on Mar. 2, 2004. ).*

*Primary Examiner* — David Angwin

(57) ABSTRACT

A method of fabricating a fluid feed slot in a print head substrate includes making a cut into a first surface of a substrate using a cutting disk having a generally planar surface oriented generally perpendicular to the first surface, and removing material from a second surface of the substrate. Making the cut and removing the material form, in combination, the fluid feed slot in the substrate at least a portion of which passes entirely through the substrate, with a full length of the fluid feed slot extending less than a full length of the substrate, and making the cut into the first surface includes providing a first completed portion of the fluid feed slot with curved surfaces at opposite end walls thereof converging from the first surface toward the second surface.

13 Claims, 12 Drawing Sheets

(56) References Cited

U.S. PATENT DOCUMENTS

| | | | | | |
|---|---|---|---|---|---|
| 5,578,418 | A * | 11/1996 | Noguchi et al. | | 430/280.1 |
| 5,658,471 | A * | 8/1997 | Murthy et al. | | 216/27 |
| 5,678,290 | A * | 10/1997 | Good | | 29/25.35 |
| 5,818,481 | A * | 10/1998 | Hotomi et al. | | 347/68 |
| 5,825,076 | A * | 10/1998 | Kotvas et al. | | 257/622 |
| 5,921,846 | A * | 7/1999 | Katz | | 451/28 |
| 5,998,234 | A * | 12/1999 | Murata et al. | | 438/53 |
| 6,007,415 | A * | 12/1999 | Van Osenbruggen | | 451/488 |
| 6,041,501 | A * | 3/2000 | Suzuki et al. | | 29/890.1 |
| 6,074,048 | A * | 6/2000 | Hotomi et al. | | 347/71 |
| 6,113,225 | A * | 9/2000 | Miyata et al. | | 347/70 |
| 6,117,347 | A * | 9/2000 | Ishida | | 216/52 |
| 6,139,132 | A * | 10/2000 | Yasukawa et al. | | 347/70 |
| 6,143,190 | A * | 11/2000 | Yagi et al. | | 216/27 |
| 6,238,269 | B1 * | 5/2001 | Pollard et al. | | 451/36 |
| 6,241,335 | B1 * | 6/2001 | Suzuki | | 347/20 |
| 6,267,904 | B1 * | 7/2001 | Silverbrook | | 216/27 |
| 6,271,102 | B1 * | 8/2001 | Brouillette et al. | | 438/462 |
| 6,286,938 | B1 * | 9/2001 | Okano et al. | | 347/55 |
| 6,291,317 | B1 * | 9/2001 | Salatino et al. | | 438/462 |
| 6,312,612 | B1 * | 11/2001 | Sherman et al. | | 216/2 |
| 6,318,844 | B1 * | 11/2001 | Witteveen et al. | | 347/48 |
| 6,345,885 | B1 * | 2/2002 | Lin et al. | | 347/61 |
| 6,412,921 | B1 * | 7/2002 | Manini | | 347/65 |
| 6,467,876 | B1 * | 10/2002 | Karasawa et al. | | 347/45 |
| 6,896,360 | B2 * | 5/2005 | Cox et al. | | 347/65 |
| 7,051,426 | B2 * | 5/2006 | Buswell | | 29/611 |
| 7,874,654 | B2 * | 1/2011 | Nikkel et al. | | 347/71 |
| 7,966,728 | B2 * | 6/2011 | Buswell | | 29/890.1 |
| 2003/0095166 | A1 * | 5/2003 | Tan et al. | | 347/63 |
| 2003/0140497 | A1 * | 7/2003 | Rivas et al. | | 29/890.1 |
| 2003/0164355 | A1 * | 9/2003 | Park | | 216/27 |
| 2005/0211236 | A1 * | 9/2005 | Akram et al. | | 125/23.01 |

* cited by examiner

METHODS AND SYSTEMS FOR FORMING SLOTS IN A SEMICONDUCTOR SUBSTRATE

CROSS-REFERENCE TO RELATED APPLICATIONS

This application is a Divisional of U.S. patent application Ser. No. 10/061,492 filed Jan. 31, 2007, now abandoned.

BACKGROUND OF THE INVENTION

Inkjet printers have become ubiquitous in society. These printers provide many desirable characteristics at an affordable price. However, the desire for ever more features at ever-lower prices continues to press manufacturers to improve efficiencies. Consumers want ever higher print image resolution, realistic colors, and increased pages of printing per minute. One way of achieving consumer demands is by improving the print head and its method of manufacture. Currently, the print head is time consuming and costly to make.

Accordingly, the present invention arose out of a desire to provide fast and economical methods for forming print heads and other fluid ejecting devices having desirable characteristics.

BRIEF DESCRIPTION OF THE DRAWINGS

The same components are used throughout the drawings to reference like features and components.

DETAILED DESCRIPTION OF THE PREFERRED EMBODIMENTS

Overview

The embodiments described below pertain to methods and systems for forming slots in a semiconductor substrate. One embodiment of this process will be described in the context of forming fluid feed slots in a print head die substrate. As commonly used in print head dies, the semiconductor substrate often has microelectronics incorporated within, deposited over, and/or supported by the substrate. The fluid feed slot(s) allow fluid to be supplied to fluid ejecting elements contained in ejection chambers within the print head. The fluid ejection elements commonly comprise heating elements or firing resistors that heat fluid or fluid causing increased pressure in the ejection chamber. A portion of that fluid can be ejected through a firing nozzle with the ejected fluid being replaced by fluid from the fluid feed slot.

The fluid feed slot can be made in various ways. In one exemplary embodiment, a slot can be formed by making a saw cut from one side or surface of the substrate. This exemplary embodiment can also remove material from a side opposite the first side using various removal techniques. The combination of cutting and removing can form a slot through the substrate in some embodiments. Slots made this way can be very narrow and as long as desired. Narrow slots remove less material and have beneficial strength characteristics that can reduce die fragility. This, in turn, can allow slots to be positioned closer together on the die.

Although exemplary embodiments described herein are described in the context of providing dies for use in inkjet printers, it is recognized and understood that the techniques described herein can be applicable to other applications where slots are desired to be formed in a substrate.

The various components described below may not be illustrated accurately as far as their size is concerned. Rather, the included figures are intended as diagrammatic representations to illustrate to the reader various inventive principles that are described herein.

Exemplary Printer System

Figure 1:
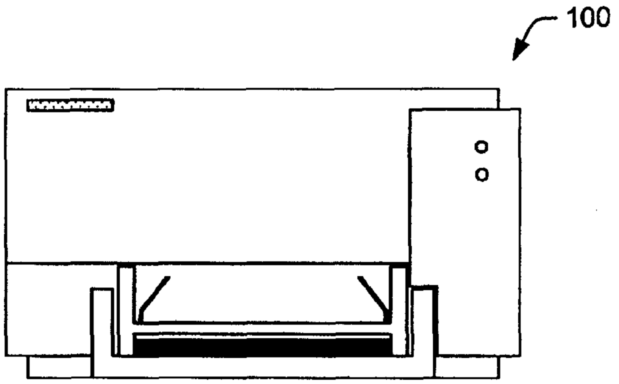
FIG. 1 is a front elevational view of an exemplary printer.

FIG. 1 shows one embodiment of a printer 100, embodied in the form of an inkjet printer. The printer 100 can be, but need not be, representative of an inkjet printer series manufactured by the Hewlett-Packard Company under the trademark "DeskJet". The inkjet printer 100 is capable of printing in black-and-white and/or in color. The term "printer" refers to any type of printer or printing device that ejects fluid or other pigmented materials onto a print media. Though an inkjet printer is shown for exemplary purposes, it is noted that aspects of the described embodiments can be implemented in other forms of printing devices that employ inkjet printing elements or other fluid ejecting devices, such as facsimile machines, photocopiers, and the like.

Figure 2:
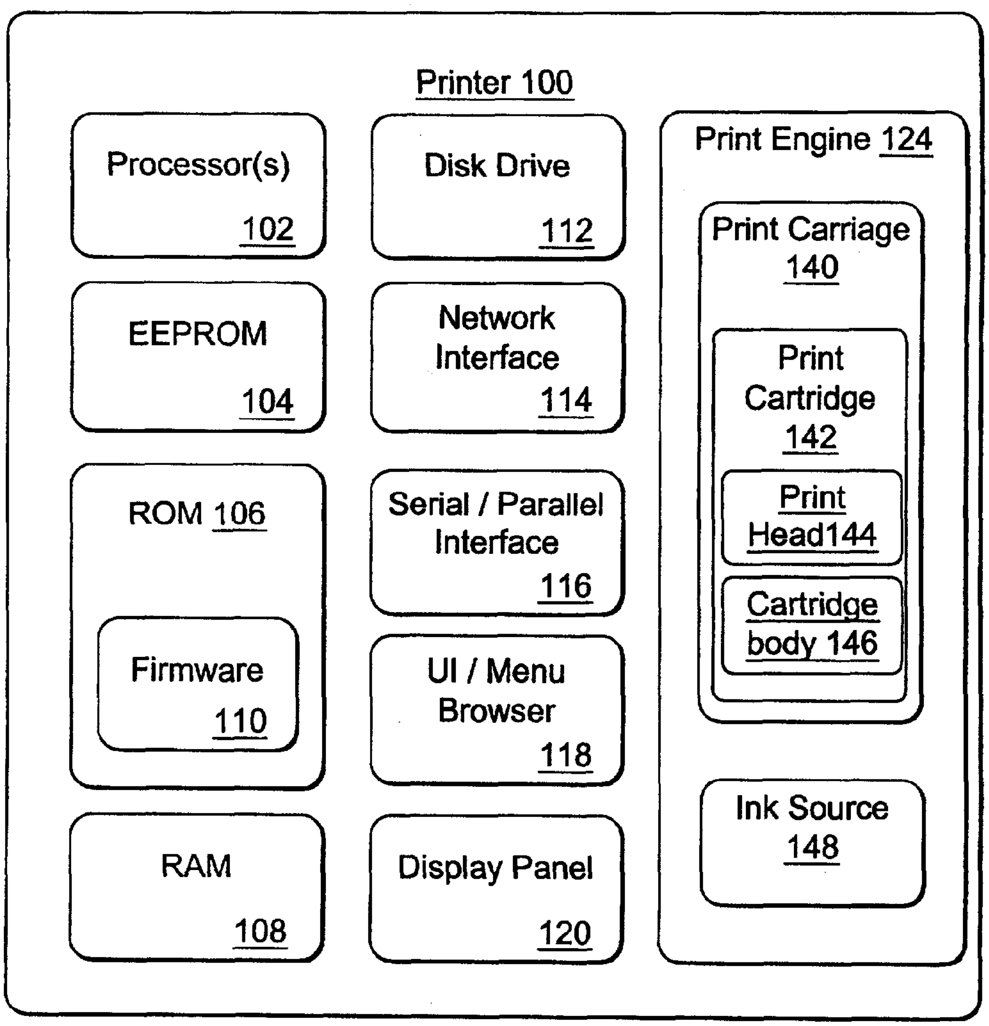
FIG. 2 is a block diagram that illustrates various components of an exemplary printer.

FIG. 2 illustrates various components in one embodiment of printer 100 that can be utilized to implement the inventive techniques described herein. Printer 100 can include one or more processors 102. The processor 102 controls various printer operations, such as media handling and carriage movement for linear positioning of the print head over a print media (e.g., paper, transparency, etc.).

Printer 100 can have an electrically erasable programmable read-only memory (EEPROM) 104, ROM 106 (non-erasable), and/or a random access memory (RAM) 108. Although printer 100 is illustrated having an EEPROM 104 and ROM 106, a particular printer may only include one of the memory components. Additionally, although not shown, a system bus typically connects the various components within the printing device 100.

The printer 100 can also have a firmware component 110 that is implemented as a permanent memory module stored on ROM 106, in one embodiment. The firmware 110 is programmed and tested like software, and is distributed with the printer 100. The firmware 110 can be implemented to coordinate operations of the hardware within printer 100 and contains programming constructs used to perform such operations.

In this embodiment, processor(s) 102 process various instructions to control the operation of the printer 100 and to communicate with other electronic and computing devices. The memory components, EEPROM 104, ROM 106, and RAM 108, store various information and/or data such as configuration information, fonts, templates, data being printed, and menu structure information. Although not shown in this embodiment, a particular printer can also include a flash memory device in place of or in addition to EEPROM 104 and ROM 106.

Printer 100 can also include a disk drive 112, a network interface 114, and a serial/parallel interface 116 as shown in the embodiment of FIG. 2. Disk drive 112 provides additional storage for data being printed or other information maintained by the printer 100. Although printer 100 is illustrated having both RAM 108 and a disk drive 112, a particular printer may include either RAM 108 or disk drive 112, depending on the storage needs of the printer. For example, an inexpensive printer may include a small amount of RAM 108 and no disk drive 112, thereby reducing the manufacturing cost of the printer.

Network interface 114 provides a connection between printer 100 and a data communication network in the embodiment shown. The network interface 114 allows devices coupled to a common data communication network to send print jobs, menu data, and other information to printer 100 via the network. Similarly, serial/parallel interface 116 provides a data communication path directly between printer 100 and another electronic or computing device. Although printer 100 is illustrated having a network interface 114 and serial/parallel interface 116, a particular printer may only include one interface component.

Printer 100 can also include a user interface and menu browser 118, and a display panel 120 as shown in the embodiment of FIG. 2. The user interface and menu browser 118 allows a user of the printer 100 to navigate the printer's menu structure. User interface 118 can be indicators or a series of buttons, switches, or other selectable controls that are manipulated by a user of the printer. Display panel 120 is a graphical display that provides information regarding the status of the printer 100 and the current options available to a user through the menu structure.

This embodiment of printer 100 also includes a print engine 124 that includes mechanisms arranged to selectively apply fluid (e.g., liquid ink) to a print media such as paper, plastic, fabric, and the like in accordance with print data corresponding to a print job.

The print engine 124 can comprise a print carriage 140. The print carriage can contain one or more print cartridges 142. In one exemplary embodiment, the print cartridge 142 can comprise a print head 144 and a print cartridge body 146. Additionally, the print engine can comprise one or more fluid sources 148 for providing fluid to the print cartridges and ultimately to a print media via the print heads.

Exemplary Embodiments and Methods

Figure 4:
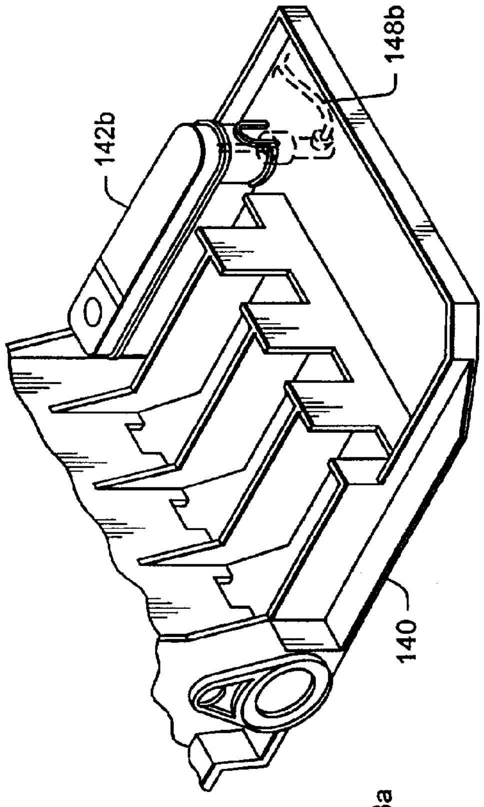
FIG. 4 is a perspective view of a print carriage in accordance with one exemplary embodiment.
Figure 3:
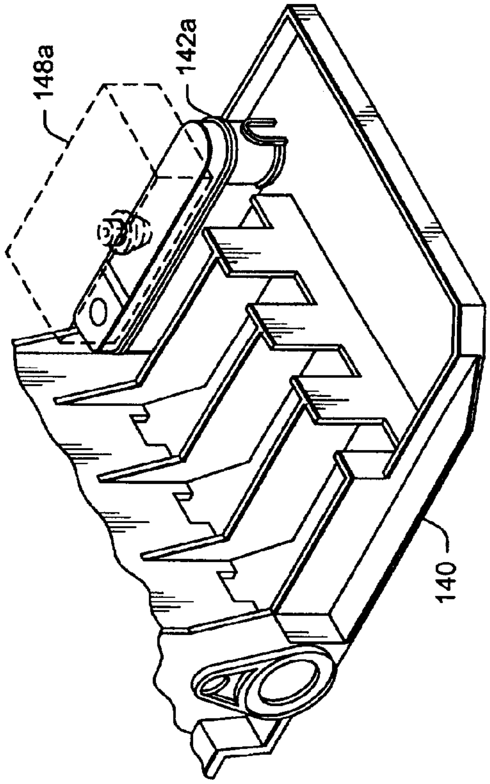
FIG. 3 is a perspective view of a print carriage in accordance with one exemplary embodiment.

FIGS. 3 and 4 show exemplary print cartridges (142*a* and 142*b*) in a print carriage 140. The print carriages depicted are configured to hold four print cartridges although only one print cartridge is shown. Many other exemplary configurations are possible. FIG. 3 shows the print cartridge 142*a* configured for an up connect to a fluid source 148*a*, while FIG. 4 shows print cartridge 142*b* configured to down connect to a fluid source 148*b*. Other exemplary configurations are possible including but not limited the print cartridge having its own self-contained fluid supply.

Figure 5:
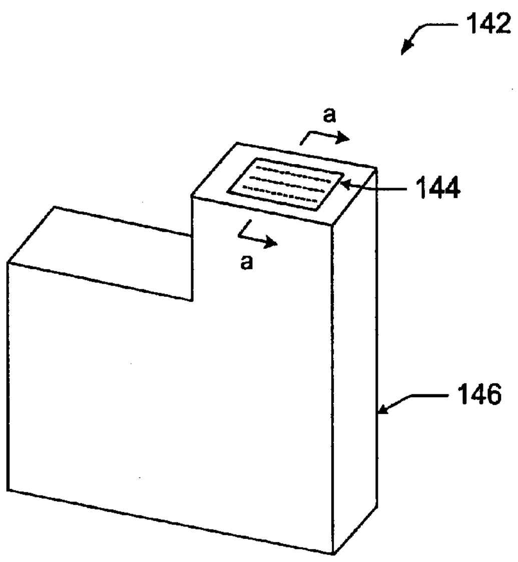
FIG. 5 is a perspective view of a print cartridge in accordance with one exemplary embodiment.

FIG. 5 shows an exemplary print cartridge 142. The print cartridge is comprised of the print head 144 and the cartridge body 146. Other exemplary configurations will be recognized by those of skill in the art.

Figure 6:
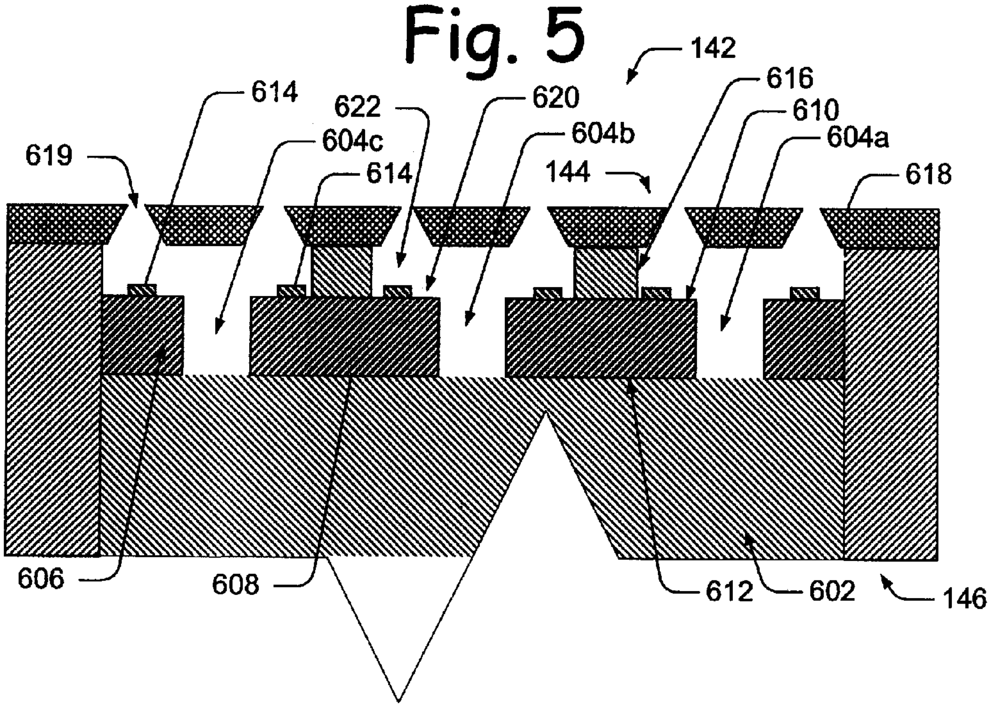
FIG. 6 is a cross-sectional view of a print cartridge in accordance with one exemplary embodiment.

FIG. 6 shows a cross-sectional representation of a portion of the exemplary print cartridge 142 taken along line a-a in FIG. 5. It shows the cartridge body 146 containing fluid 602 for supply to the print head 144. In this embodiment, the print cartridge is configured to supply one color of fluid to the print head. In this embodiment, a number of different fluid feed slots are provided, with three exemplary slots being shown at 604*a*, 604*b*, and 604*c*. Other exemplary embodiments can divide the fluid supply so that each of the three fluid feed slots 604*a*-604*c* receives a separate fluid supply. Other exemplary print heads can utilize less or more slots than the three shown here.

The various fluid feed slots pass through portions of a substrate 606 in this embodiment. Silicon can be a suitable substrate, for this embodiment. In some embodiments, substrate 606 comprises a crystalline substrate such as single crystalline silicon or polycrystalline silicon. Examples of other suitable substrates include, among others, gallium arsenide, glass, silica, ceramics or a semi conducting material. The substrate can comprise various configurations as will be recognized by one of skill in the art. In this exemplary embodiment, the substrate comprises a base layer, shown here as silicon substrate 608. The silicon substrate has a first surface 610 and a second surface 612. Positioned above the silicon substrate are the independently controllable fluid drop generators that in this embodiment comprise firing resistors 614. In this exemplary embodiment, the resistors are part of a stack of thin film layers on top of the silicon substrate 608. The thin film layers can further comprise a barrier layer 616. The barrier layer can comprise, among other things, a photoresist polymer substrate. Above the barrier layer is an orifice plate 618 that can comprise, but is not limited to a nickel substrate. The orifice plate has a plurality of nozzles 619 through which fluid heated by the various resistors can be ejected for printing on a print media (not shown). The various layers can be formed, deposited, or attached upon the preceding layers. The configuration given here is but one possible configuration. For example, in an alternative embodiment, the orifice plate and barrier layer are integral.

The exemplary print cartridge shown in FIGS. 5 and 6 is upside down from the common orientation during usage. When positioned for use, fluid can flow from the cartridge body 146 into one or more of the slots 604*a*-604*c*. From the slots, the fluid can travel through a fluid feed passageway 620 that leads to a firing chamber 622. A firing chamber can be comprised of a firing resistor, a nozzle, and a given volume of space therein. Other configurations are also possible. When an electrical current is passed through the resistor in a given firing chamber, the fluid can be heated to its boiling point so that it expands to eject a portion of the fluid from the nozzle 619. The ejected fluid can then be replaced by additional fluid from the fluid feed passageway 620.

Figure 7:
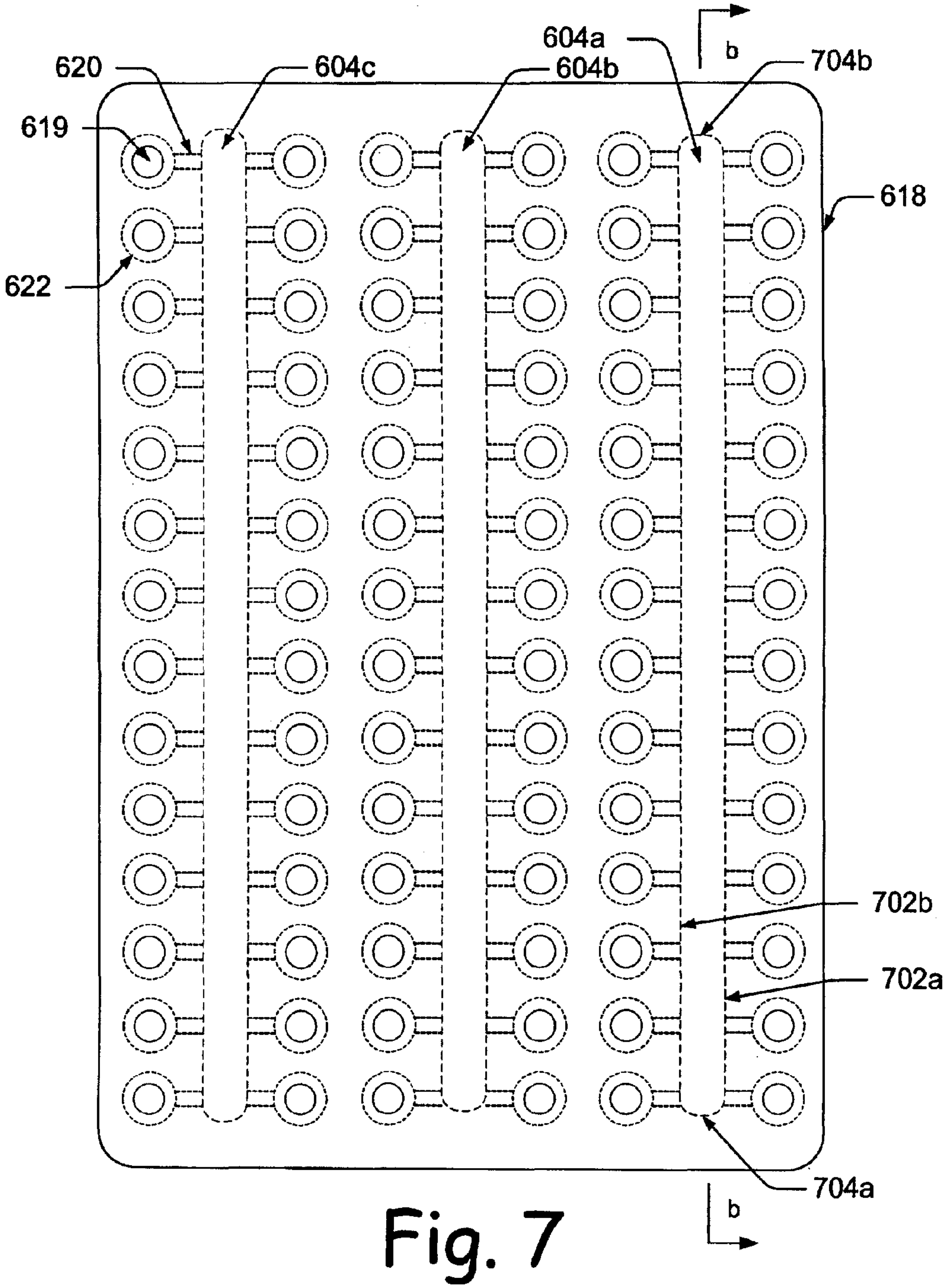
FIG. 7 is a top view of a print head in accordance with one exemplary embodiment.

The embodiment of FIG. 7 shows a view from above the thin-film surface of a substrate incorporated into a print head. The substrate is covered by the orifice plate 618 with underlying structures of the print head indicated in dashed lines in this embodiment. The orifice plate is shown with numerous nozzles 619. Below each nozzle lies the firing chamber 622 that is connected to a fluid feed passageway (feed channel) 620 and then to slot 604*a-c*. Slot 604*a* has indicated generally opposing sidewalls 602*a* and 602*b* and end walls 604*a* and 604*b*. The slots are illustrated in this embodiment as an elliptical configuration when viewed from above the first surface of the substrate. Other exemplary geometries include rectangular among others.

Exemplary Slot Forming Techniques

FIGS. 8*a*-11*e* show exemplary embodiments that remove portions of the substrate to form fluid feed slots through the substrate. The Figs. represent a portion of cross-sections taken along line b-b indicated in FIG. 7. The Figs. show a mechanical cutting tool 800. In these exemplary embodiments, the cutting tool can comprise a circular cutting disk or saw 802. Other exemplary embodiments can utilize various reciprocating or vibrating saws among others. The exemplary slotting techniques described above and below can be implemented manually and/or can be automated.

Figure 8A:
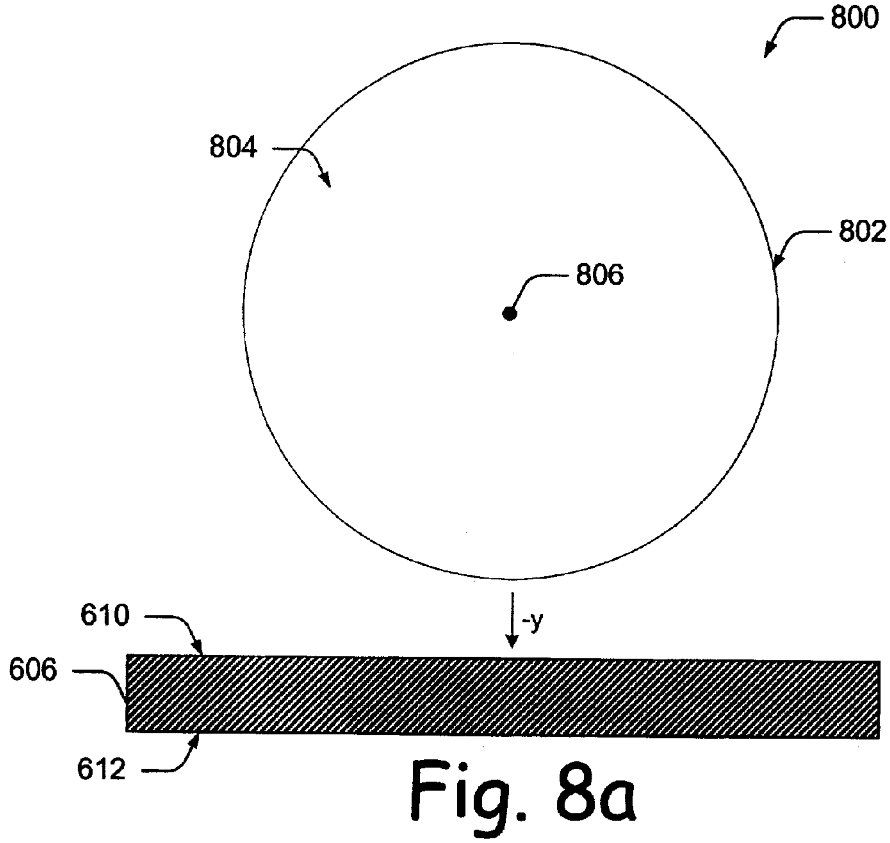
FIG. 8*a*-8*e* show a cross-sectional view of a substrate in accordance with one exemplary embodiment.

In the present embodiment, as depicted in FIG. 8*a*, the circular saw 802 can have a generally planar surface 804 that is oriented generally perpendicular to the first surface 610 of the substrate 606. This can be seen for example in FIG. 8*a* where the saw revolves around an origin or axis of rotation 806 that extends into and out of the page. The circular saw is capable of spinning in a clockwise or counterclockwise direction about the axis of rotation. Other suitable embodiments can spin in one direction and reverse to spin in the other direction or a combination thereof. Suitable saws can have a blade comprising diamond grit, or other suitable material. Suitable circular saws can be obtained from Disco and KNS, among others. Exemplary saw blades can have diameters ranging from less than about ¼ of an inch to more than to inches. One particular embodiment uses a saw blade having a diameter of about ½ inch.

FIG. 8*a* shows the circular saw 802 positioned above the substrate so that the saw can be lowered along the −y-axis to contact the substrate. Various substrates can be utilized, with exemplary embodiments having thicknesses ranging from less than 100 microns to more than 2000 microns. In this exemplary embodiment, the substrate is removed by the mechanical cutting action of the saw, other methods of removing substrate will be discussed below. The saw can continue to be lowered through the substrate to a desired depth. The cut made by this vertical movement of the saw is commonly called a chop or plunge cut.

Figure 8B:
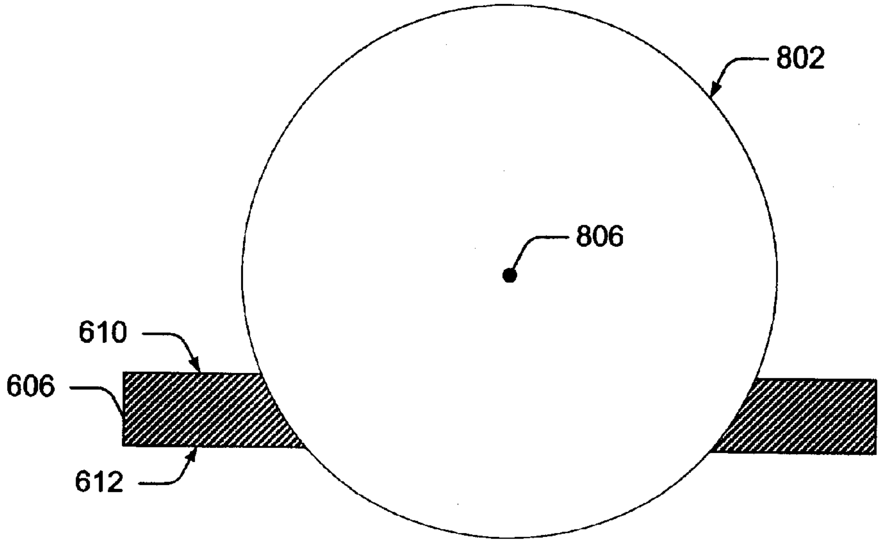

FIG. 8*b* shows an exemplary embodiment where the saw has been lowered along the −y-axis so as to pass all of the way through a portion of the substrate 606. It will be noted that, in this embodiment, though the saw has passed through the substrate, the axis of rotation 806 has not contacted or been extended to a position within the substrate. Other embodiments can have other orientations.

Figure 8C:
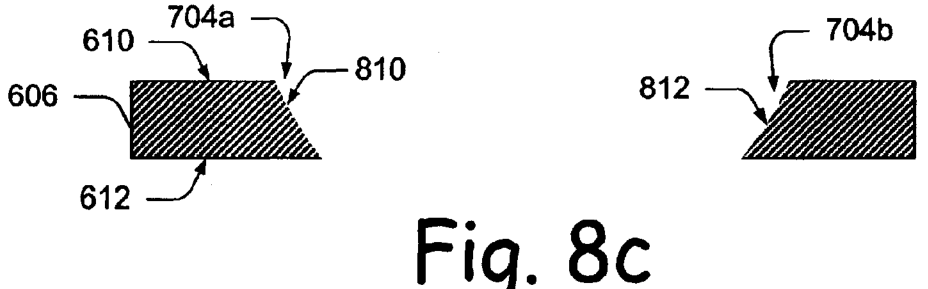

FIG. 8*c* shows the result of the cutting when the saw blade is removed from the substrate. The cut is defined by two generally parallel sidewalls 702*a* and 702*b* (shown FIG. 7) connected or joined by a first end wall 704*a* and a second end wall 704*b* (shown FIG. 7 and FIG. 8*c*). End wall 704*a* has a first surface 810 and end wall 704*b* has a second surface 812.

Figure 8D:
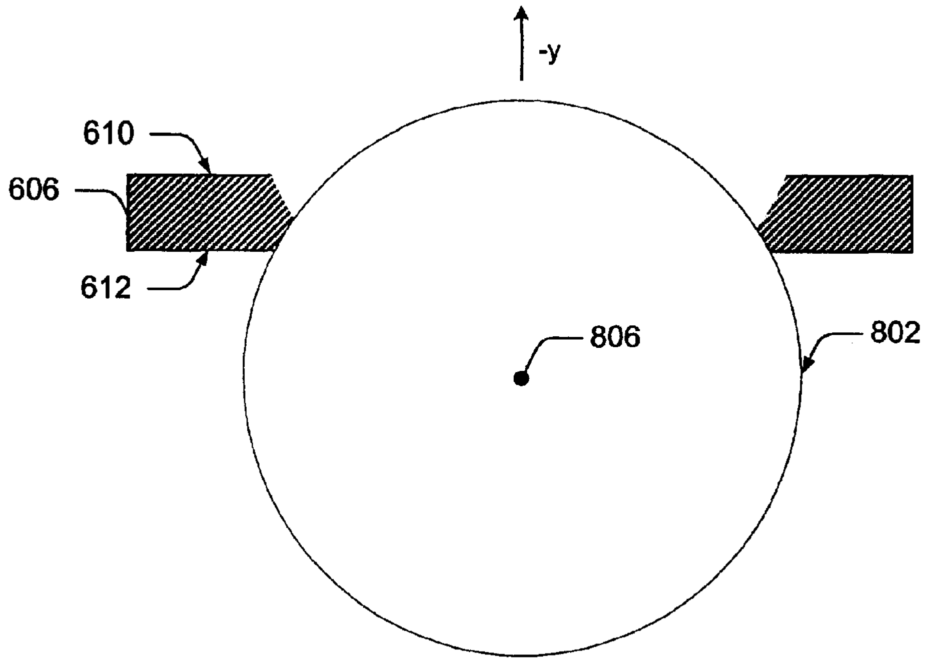
Figure 8E:
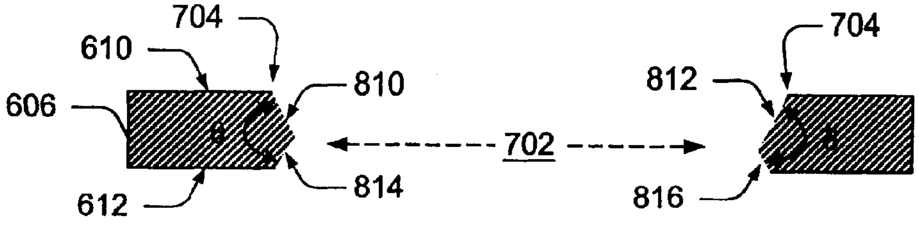

FIG. 8*d* shows a second chop cut being made into the substrate starting at the second surface 612. FIG. 8*e* shows the resultant slot upon completion of the second chop cut. Each of the end walls of the slot now has two surfaces. End wall 704*a* is defined by surface 810 from the first cut and surface 814 from the second cut. End wall 704*b* has surface 812 from the first cut and surface 816 from the second cut. In this exemplary embodiment, each of the surfaces 810-816 is curved or arched. Other exemplary configuration will be described below.

The described surfaces 810 and 814 meet to form an angle θ relative to the substrate 606. Similarly, surfaces 812 and 816 meet to form an angle δ relative to the substrate. In some exemplary embodiments, these angles can be equal to or greater than 90 degrees. Maintaining such an angle can increase the strength of the resultant substrate as compared to other configurations. By increasing the strength of the substrate, slots can be positioned closer together which can decrease material costs of production. The increased substrate strength can also decrease production costs associated with die breakage during assembly.

Other features of the described embodiments can also provide improved substrates over existing technologies. For example, in some exemplary embodiments, the saw can make a cut where the distance between the sidewalls is less than about 30 microns. Other exemplary embodiments utilize saw cut widths up to 200 or more microns.

Such narrow slots have a high aspect ratio, where the aspect ratio is the thickness of the substrate divided by the width of the slot. The configurations of some embodiments can have aspect ratios from greater than or equal to 1 to greater than or equal to about 22. With one particular embodiment having an aspect ratio of about 3. The high aspect ratio slots of the exemplary embodiments can allow fluid feed slots to be formed that remove less substrate material and therefore allow slots to be places closer together on the substrate without weakening the substrate. Print head dies utilizing such substrates can be more compact, stronger, and cheaper to produce.

Additionally, cuts and/or slots made in the substrate with the circular saw can have cleaner side edges with less chipping than other slotting techniques. For example, slots made with the circular saw can have chips in the sidewalls in the range of about 5-10 microns, whereas existing sand drilling technology can create chips in excess of about 45-50 microns. This feature in addition to the increased substrate strength can further allow slots to be placed closer together on the substrate than existing technologies.

FIGS. 9*a*-9*f* show another exemplary embodiment for making slot(s) in a substrate.

Figure 9A:
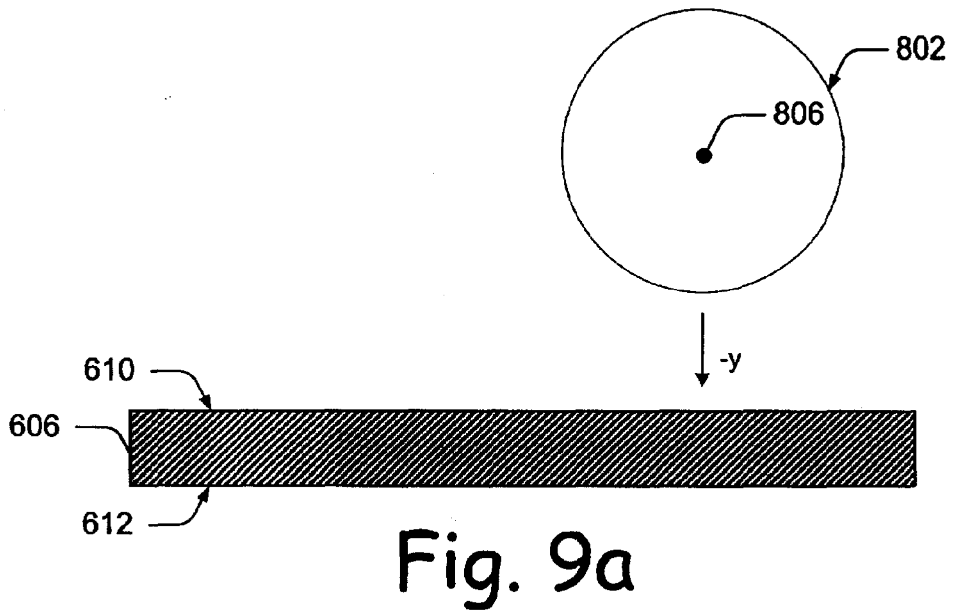
FIG. 9*a*-9*f* show a cross-sectional view of a substrate in accordance with one exemplary embodiment.

FIG. 9*a* shows the circular saw 802 positioned above the substrate so that the saw can be lowered along the −y-axis to contact the substrate. The spinning saw can cut away substrate that it contacts, shown generally as 907. The saw can continue to be lowered through the substrate to a desired depth.

Figure 9B:
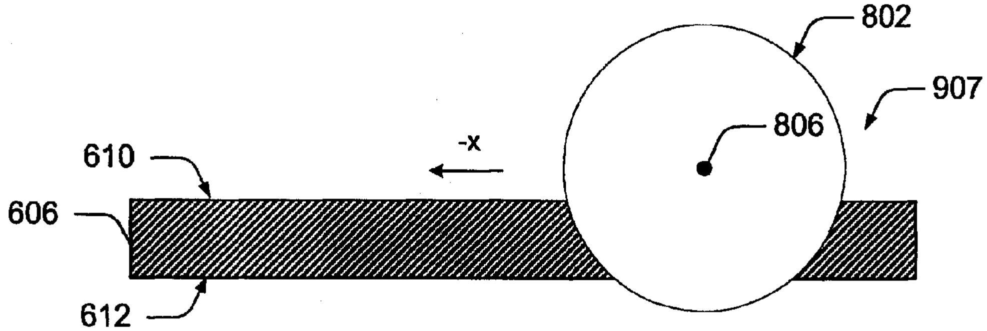
Figure 9C:
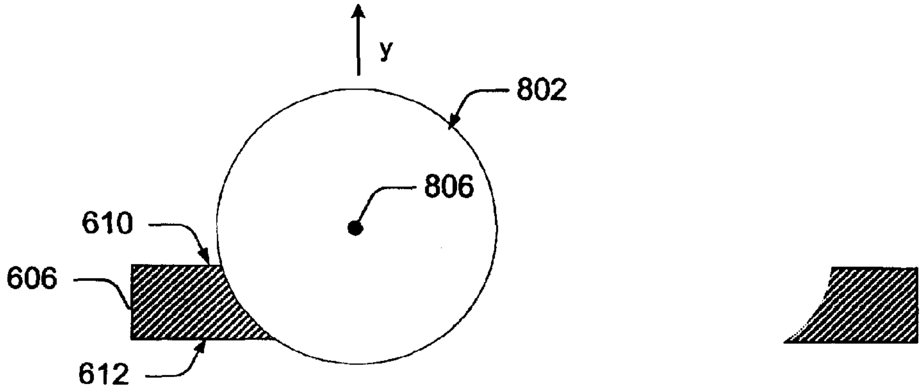

FIG. 9*b* shows an exemplary embodiment where the saw was lowered along the −y-axis until the saw passed all the way through the substrate 606. Other exemplary embodiments can cut through less than the entire thickness of the substrate, and/or make multiple passes to cut the desired thickness. Regardless of the depth cut, the saw can then be moved along the −x-axis for a desired distance. This is commonly referred to as a drag cut. When the saw has reached the desired distance along the x-axis, it can be moved along the y-axis to cease contact with the substrate. For example, FIG. 9*c* shows the saw having reached the desired distance in the x direction. The saw can now be moved along the y-axis away from the substrate.

Figure 9D:
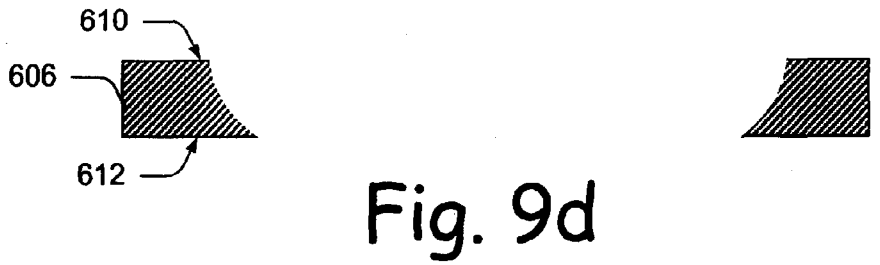

FIG. 9*d* shows the substrate after the cutting performed in FIGS. 9*a*-9*c*.

Figure 9E:
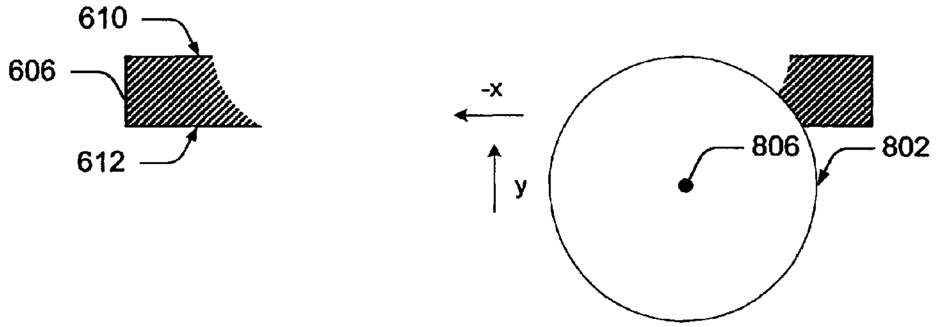
Figure 9F:

FIG. 9*e* shows material being removed from the opposite side of the substrate as shown in FIGS. 9*a*-9*c*. In this exemplary embodiment, the substrate has been maintained in the original orientation and the saw 802 is being used from the opposite side of the substrate. Alternatively, other exemplary embodiments can flip or otherwise reposition the substrate to reorient the second surface adjacent to the saw or other cutting device. As shown, the first surface to be cut comprised the thin film side, however, either side can be cut first. For example, in other exemplary embodiments, the backside can be cut first, then the thin film side.

In the exemplary embodiments shown in FIGS. 9*a*-9*e*, the saw was moved along a single axis at a time and a single pass was made through the substrate from a given side, in other exemplary embodiments the saw can be moved in both the x and y axes simultaneously. Additionally, the described embodiments show the saw cutting through the substrate in a single pass from each side. Other exemplary embodiments can make multiple passes from one or both of the sides to remove a desired amount of substrate. Additionally, some exemplary embodiments can achieve the cut(s) by moving the substrate and leaving the saw stationary, while others can move the saw and still others can utilize a combination of movements.

Utilizing a drag cut, as shown in FIGS. 9*b* and 9*e* allows the formation of slots of any desired length. This can be advantageous as greater slot length can increase printer speed. The greater slot length can increase printer speed, by among other things, allowing the print head to cover a wider swath on the print media per pass. The use of the circular saw can also decrease the time required to make each slot. With some existing embodiments, a saw cut from one side of the substrate can easily be accomplished in about 1 to 2 seconds. This is much faster than existing technology that takes about 8 to 10 seconds or more to make a slot. Further, in these embodiments, increasing the slot length adds very little time to this method whereas existing methods take substantially longer to produce longer slots. In some embodiments, the slots can be as long as desired while maintaining a high aspect ratio as described above.

FIGS. 10*a*-10*e* show another exemplary embodiment for forming a slot. In this embodiment, the saw is utilized to make a cut in one side of the substrate and another technique, other than sawing, is utilized to remove material from the opposite side.

Figure 10A:
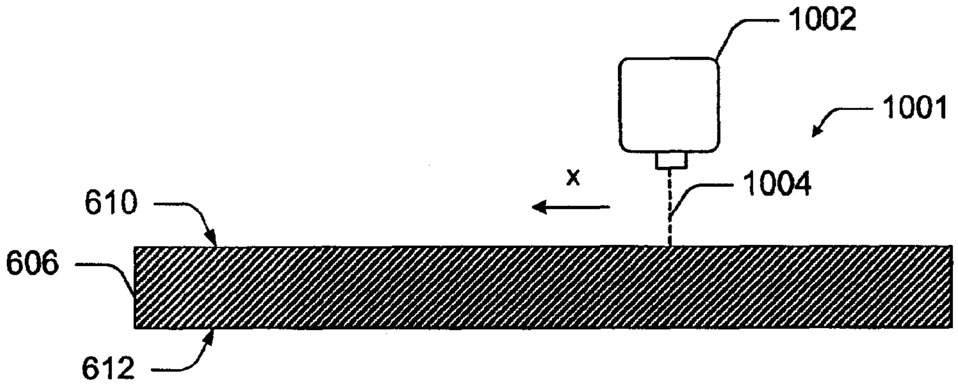
FIG. 10*a*-10*d* show a cross-sectional view of a substrate in accordance with one exemplary embodiment.

FIG. 10*a* shows substrate being removed from the first side 610 of the substrate 606. In this exemplary embodiment, the substrate is being removed, generally at 1001, with a laser machine 1002. The laser machine is emitting a laser beam 1004. This process is commonly referred to as laser ablation or laser machining. Other exemplary embodiments can use wet or dry etching and rotating drill bits among others. It can be advantageous to use these processes in combination with sawing, because among other reasons, these processes tend to decrease in efficiency as they remove material at greater depths. For example, in one embodiment, a laser cut can become much slower as the depth increases because debris builds up in the trench as the depth increases. With the described embodiments, a shallow trench can be created with the laser or other process and the majority of the thickness of the substrate can be removed with the saw from the other side.

Figure 10B:
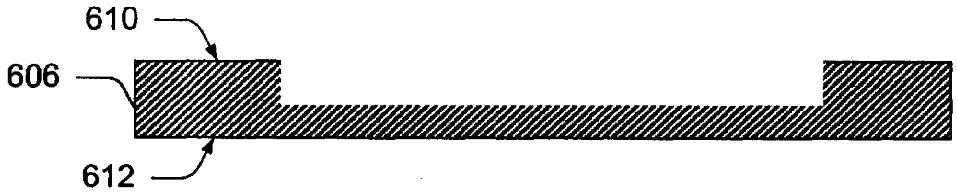

FIG. 10*b* shows the substrate with a portion removed by the laser. In this embodiment, the laser has removed approximately 50 percent of the thickness of the substrate. Other exemplary embodiments can remove from less than about 1% to about 100% of the thickness of the substrate.

Figure 10C:
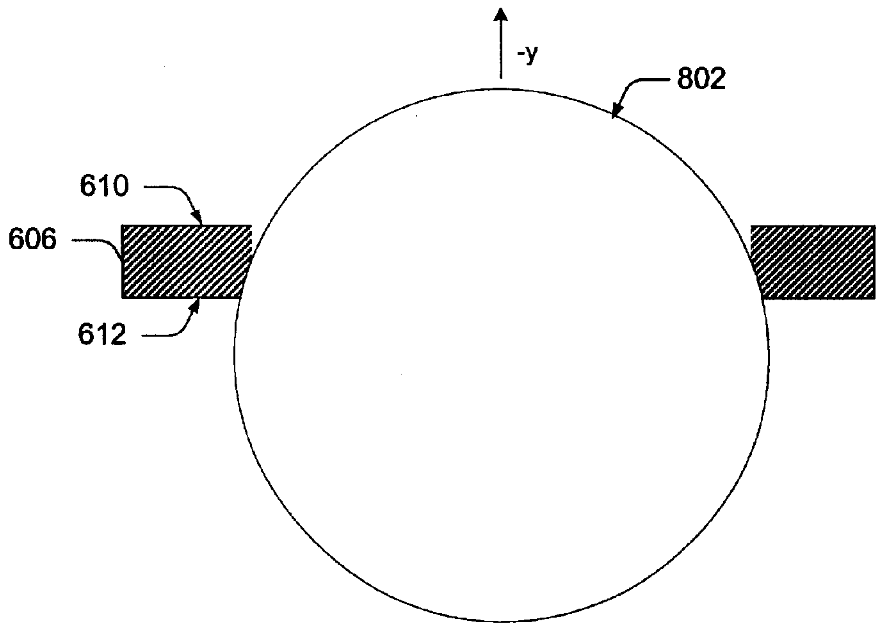
Figure 10D:

FIG. 10*c* shows the saw 802 contacting the substrate from the second surface 612. In this exemplary embodiment, the saw cut is intersecting, or combining with portions, of the laser cut. As can be seen in FIG. 10*d* at least a portion of the combined cutting and removing makes a slot that passes entirely through the thickness of the substrate. In this exemplary embodiment, the second cut was made with a single chop cut of the saw. Other exemplary embodiments can utilize one or more chop cuts combined with one or more drag cuts to remove the substrate. Also, in some embodiments, the laser process can occur first and the saw cut second as shown. Alternatively, in some embodiments, the saw cut can be first and the laser second. Further, the laser process can be used on the thin film side with the saw used on the backside or conversely, the laser can be used on the backside and the saw cut on the thin film side, in some embodiments.

In a further embodiment, sand drilling can be utilized to remove material from the backside and the saw cut utilized to remove material from the front side. In this exemplary embodiment, as with those discussed previously, the order of the processes is interchangeable.

Figure 11A:
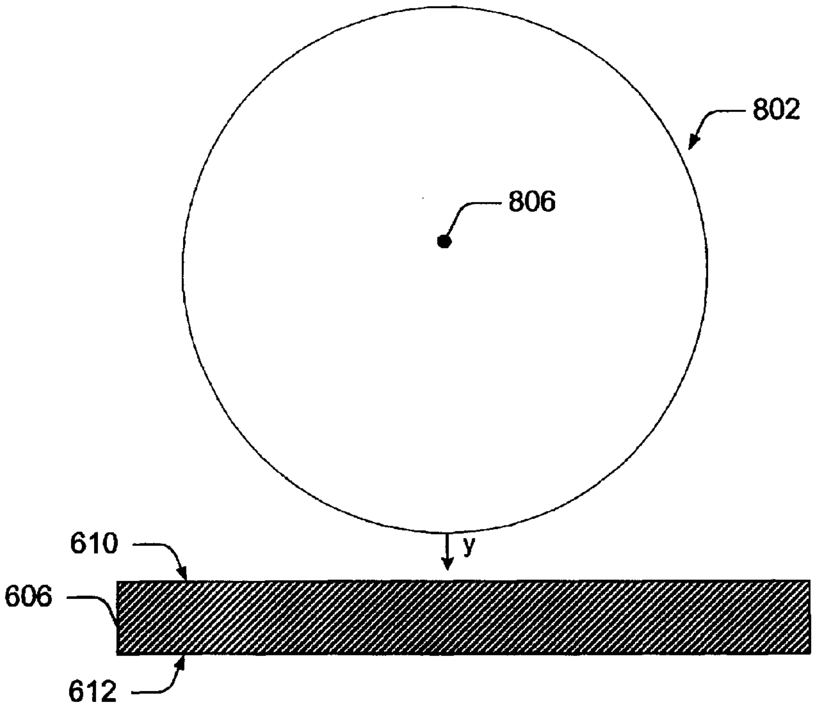
FIG. 11*a*-11*e* show a cross-sectional view of a substrate in accordance with one exemplary embodiment.
Figure 11B:
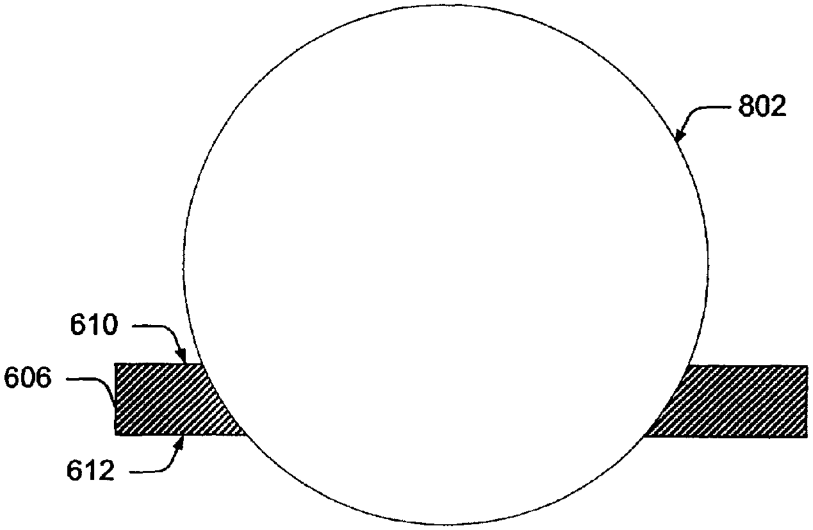
Figure 11C:
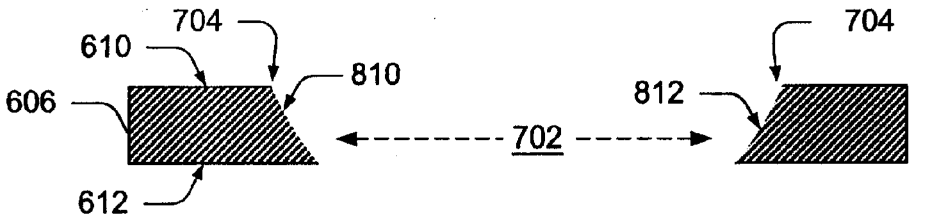
Figure 11D:
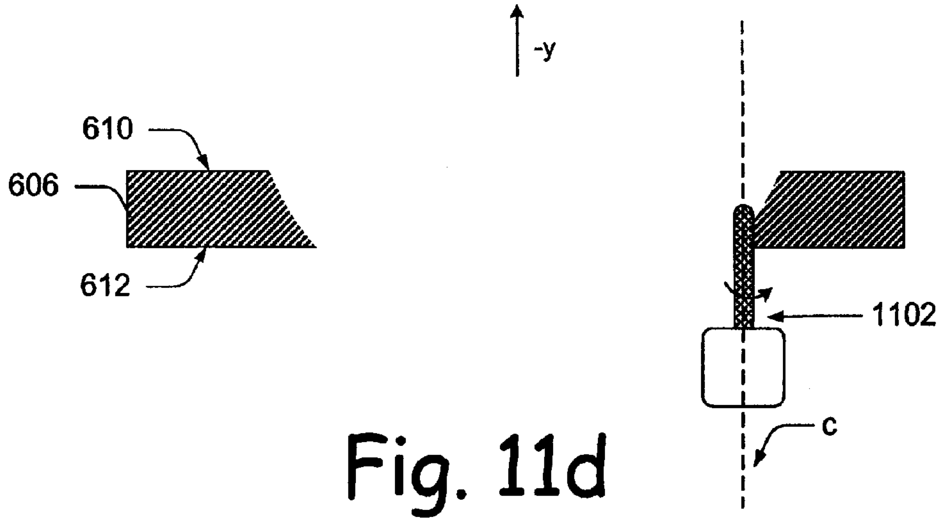
Figure 11E:
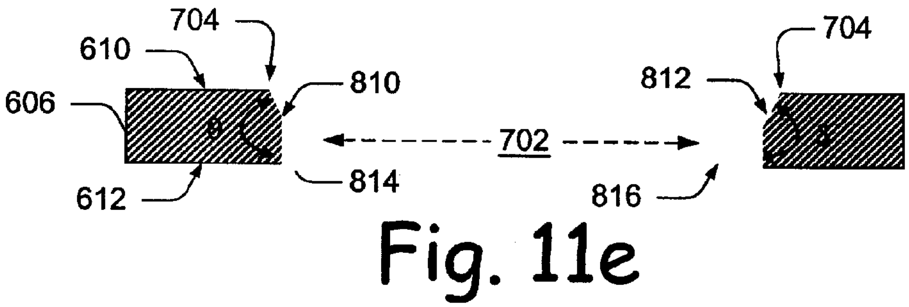

FIGS. 11*a*-11*e* show a further exemplary embodiment for forming slot(s) in the substrate. FIGS. 11*a* and 11*b* show the saw making a chop cut to remove material from the first side, in one embodiment. FIG. 11*c* shows the cut after the saw has been removed from the substrate, in another embodiment. In another embodiment, FIG. 11*d* shows a rotating drill bit 1102 being used to remove material from the second side. The drill bit can spin on an axis c generally perpendicular to the first surface of the substrate. In this embodiment, when the drill bit enters the substrate this axis also enters the substrate. The drill bit shown here is cylindrical, but other shapes including conical bits among others can be used. FIG. 11*e* shows the slot after completion of the above processes. In this exemplary embodiment, it can be preferable to cut with the saw from the thin film side and to remove material with the drill from the backside. In some embodiments, the use of the drill to remove material from the substrate either before or after sawing can decrease the concentration of stress forces on specific areas of the substrate when compared to saw cutting by itself. For example, after the drill bit removes material in FIG. 11*d* the resultant angle formed at the end of the slots can be maintained at approximately 90 degrees or greater, in some embodiments. This angle is measured relative to the substrate and is denoted by the symbols θ and δ.

The described embodiments have shown only steps that remove material in the slot formation process. Other exemplary embodiments can also have steps which add material. For example, a cut can be made from a first side followed by a deposition step and then an etching step from the second side to form the finished slot. Other exemplary embodiments can utilize additional finish steps to improve the quality of the slot. For example, a saw cut can be used to form a first trench from one side and another saw cut forming a second trench to form a slot, in one embodiment. In another embodiment, sand drilling can then be used to further polish or smooth the slot.

CONCLUSION

The described embodiments can provide methods and systems for forming slots in a semiconductor substrate. The slots can be formed by making a saw cut from one side of the substrate and then removing material by various means from a second opposite side of the substrate. The slots can be inexpensive and quick to form. They can be made as long as desirable and have beneficial strength characteristics that can reduce die fragility and allow slots to be positioned closer together on the die.

Although the invention has been described in language specific to structural features and methodological steps, it is to be understood that the invention defined in the appended claims is not necessarily limited to the specific features or steps described. Rather, the specific features and steps are disclosed as preferred forms of implementing the claimed invention.

What is claimed is:

1. A method of fabricating a fluid feed slot in a print head substrate, comprising:

making a cut into a first surface of a substrate using a cutting disk, the cutting disk having a generally planar surface oriented generally perpendicular to the first surface; and, removing material from a second surface of the substrate, wherein said making a cut and said removing material form, in combination, the fluid feed slot in the substrate at least a portion of which passes entirely through the substrate, a full length of the fluid feed slot extending less than a full length of the substrate, wherein said making a cut into the first surface includes providing a first completed portion of the fluid feed slot with curved surfaces at opposite end walls thereof converging from the first surface toward the second surface.

2. The method of claim 1, wherein said making a cut into the first surface comprises making a cut into a thin film side of the substrate.

3. The method of claim 1, wherein said making a cut into the first surface comprises making a cut with the cutting disk being moved in both the x and y directions relative to the substrate.

4. The method of claim 1, wherein said making a cut into the first surface comprises making a cut into a backside of the substrate.

5. The method of claim 1, wherein said making a cut with the cutting disk comprises making a cut with a circular saw.

6. The method of claim 1, wherein said making a cut into the first surface comprises making a cut at least a portion of which extends entirely through the substrate.

7. The method of claim 1, wherein said making a cut comprises making multiple passes with the cutting disk to cut a desired thickness of the substrate, including moving the cutting disk in a direction substantially parallel with the first surface during each of the multiple passes.

8. The method of claim 1, wherein said removing material comprises making a second cut into the second surface of the substrate with a cutting disk, wherein said making a second cut into the second surface includes providing a second completed portion of the fluid feed slot with curved surfaces at opposite end walls thereof converging from the second surface toward the first surface.

9. The method of claim 1, wherein said removing material comprises one or more of: sand drilling, dry etching, wet etching, and drilling with a rotary drill bit.

10. The method of claim 8, wherein the end walls of the first and second completed portions of the fluid feed slot meet at an angle greater than or equal to ninety degrees relative to the substrate.

11. The method of claim 1, wherein said removing material is performed before said making a cut.

12. The method of claim 1, wherein a finalized form of the fluid feed slot includes at least a portion of the curved surfaces at the opposite end walls thereof, and substantially parallel opposite sidewalls extending between the opposite end walls.

13. The method of claim 12, wherein the opposite sidewalls and the opposite end walls define the full length of the fluid feed slot.

* * * * *

UNITED STATES PATENT AND TRADEMARK OFFICE

CERTIFICATE OF CORRECTION

PATENT NO. : 8,510,948 B2
APPLICATION NO. : 11/736523
DATED : August 20, 2013
INVENTOR(S) : Shen Buswell et al.

It is certified that error appears in the above-identified patent and that said Letters Patent is hereby corrected as shown below:

On the title page, in Item (75), Inventors, in column 1, line 3, delete “Mahrgan” and insert -- Mehrgan --, therefor.

On the title page, in Item (75), Inventors, in column 1, line 5, delete “MacKenzle” and insert -- MacKenzie --, therefor.

Signed and Sealed this
Fifth Day of November, 2013

Teresa Stanek Rea
*Deputy Director of the United States Patent and Trademark Office*